US008386458B2

(12) United States Patent
Noguchi

(10) Patent No.: US 8,386,458 B2
(45) Date of Patent: Feb. 26, 2013

(54) MOBILE TERMINAL DEVICE AND COMPUTER PROGRAM

(75) Inventor: Yoshika Noguchi, Tokyo (JP)

(73) Assignee: Sony Mobile Communications Japan, Inc., Tokyo (JP)

( * ) Notice: Subject to any disclaimer, the term of this patent is extended or adjusted under 35 U.S.C. 154(b) by 489 days.

(21) Appl. No.: 12/369,091

(22) Filed: Feb. 11, 2009

(65) Prior Publication Data

US 2009/0240666 A1    Sep. 24, 2009

(30) Foreign Application Priority Data

Mar. 19, 2008   (JP) .................................. 2008-070802

(51) Int. Cl.
*G06F 17/30*   (2006.01)
(52) U.S. Cl. ........ 707/707; 707/723; 707/736; 707/915; 707/918; 382/190; 382/276; 348/231.3
(58) Field of Classification Search .................. 707/707, 707/723, 729, 736, 971, 915, 917, 918, 999.003; 382/190, 276; 348/231.3
See application file for complete search history.

(56) References Cited

U.S. PATENT DOCUMENTS

| 7,809,722 | B2 * | 10/2010 | Gokturk et al. | ............... | 707/736 |
| 2005/0088544 | A1 * | 4/2005 | Wang | ........................... | 348/239 |
| 2006/0078224 | A1 * | 4/2006 | Hirosawa | ...................... | 382/284 |
| 2007/0110316 | A1 * | 5/2007 | Ohashi | .......................... | 382/195 |
| 2007/0183679 | A1 * | 8/2007 | Moroto et al. | ................ | 382/254 |
| 2008/0071749 | A1 * | 3/2008 | Schloter | ........................... | 707/3 |

FOREIGN PATENT DOCUMENTS

| JP | 2000-181814 | | 6/2000 |
| JP | 2001-266169 | | 9/2001 |
| JP | 2001266169 | A * | 9/2001 |
| JP | 2003-122757 | | 4/2003 |
| JP | 2003-174578 | | 6/2003 |
| JP | 2003-271650 | | 9/2003 |
| JP | 2003271650 | A * | 9/2003 |
| JP | 2006-133876 | | 5/2006 |
| JP | 2007-323394 | | 12/2007 |

OTHER PUBLICATIONS

"What is DLNA?", DLNA (Digital Living Network Alliance), Jan. 11, 2008, URL:http://www.alpha.co.jp/biz/products/dlna/about/, 4 pages.
Notice of Reasons for Refusal issued Mar. 5, 2012 in Japanese Patent Application No. 2008-070802.

* cited by examiner

*Primary Examiner* — Dennis Truong
(74) *Attorney, Agent, or Firm* — Oblon, Spivak, McClelland, Maier & Neustadt, L.L.P.

(57) ABSTRACT

A mobile terminal device capable of coupling to the Internet and a home network, includes: accompanying information storing means operable to store an image obtained by photographing and accompanying information pertaining to the image and the photographing; search request means operable to request a search server on the Internet to execute a search with the accompanying information as a keyword; search result storing means operable to temporarily store search result obtained from the search server; image composition means operable to create a composite image by combining the search result with the image obtained by the photographing; and transmission means operable to transmit the composite image to a specified output device on the home network.

7 Claims, 13 Drawing Sheets

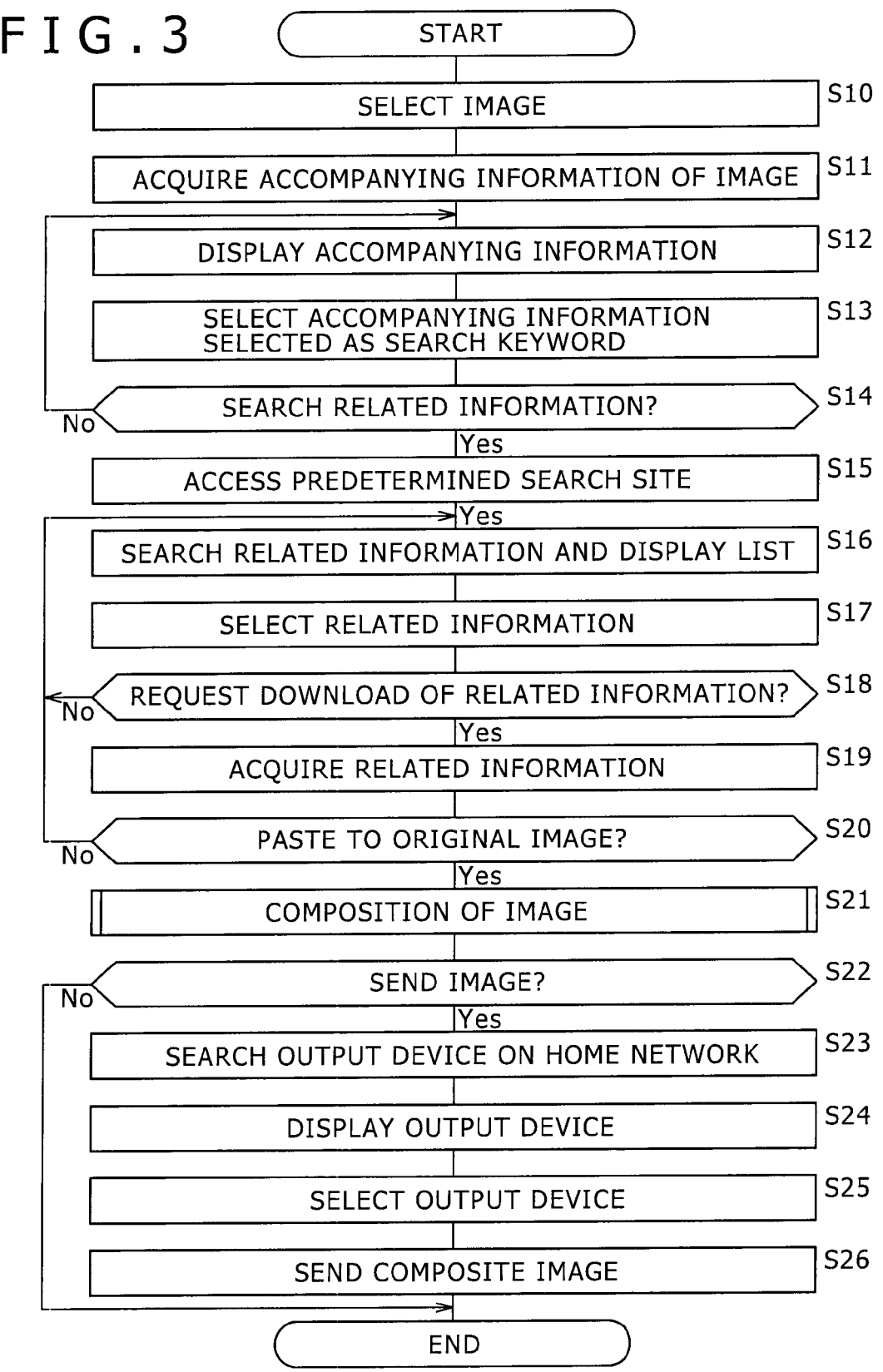

MOBILE TERMINAL DEVICE AND COMPUTER PROGRAM

CROSS REFERENCES TO RELATED APPLICATIONS

The present invention contains subject matter related to Japanese Patent application JP 2008-070802 filed in the Japanese Patent Office on Mar. 19, 2008, and the entire contents of which being incorporated herein by reference.

BACKGROUND OF THE INVENTION (1) Field of the Invention

The present invention relates to a mobile terminal device capable of coupling with the Internet and a home network and a computer program for the same.

(2) Description of the Related Art

In recent years, a mobile-phone terminal is remarkably transforming to a terminal with multifunction and high performance. Some mobile-phone terminal has appeared on the market, provided with functions including: a Web browsing function and an e-mail function using the Internet; a photograph function with a camera; and furthermore, a position detecting function by a global positioning system (GPS); and a short distance radio communication function employing such as Blue tooth (registered trademark) and a wireless LAN.

Technology is proposed in which a camera-equipped mobile-phone sends an image photographed with the camera to an image search service delivery server by e-mail, then the server extracts feature quantity from the image received and sends back to the mobile-phone the URL of a Web site which possesses similar feature quantity; accordingly, the mobile-phone, upon receiving the reply from the server, accesses the URL to obtain Web information (refer to Document 1 (Japanese patent laid-open No. 2003-271650)).

Another technology is proposed in which an image processing device reads an image recorded in a storage medium and at the same time searches map image information from position information, and creates a composite image by combining the map image information obtained by the search and the image read from the storage medium (refer to Document 2 (Japanese patent laid-open No. 2001-266169)).

If a user composes a home network by combining various equipment (including digital appliances), and utilizes the specification of DLNA (Digital Living Network Alliance) standardized so that audio-video contents could be enjoyed easily at various places of home, the user can retrieve freely digital contents stored at the server, such as a photograph, an animation, and music, and can replay them on a desired device, without performing a complicated setup (refer to Document 3 ("What is DLNA?", searched on the Internet on Jan. 11, 2008, URL:http://www.alpha.co.jp/biz/products/dlna/about/)). A mobile-phone terminal can also serve as a device in conformity with DLNA.

SUMMARY OF THE INVENTION

Although the technology described in Document 1 can obtain the information corresponding to the photographed image from a Web site, the technology aims at guiding a user to the Web site from the advertisement on a paper medium and the commodity package, and is not immediately used for an application for editing and enjoying the photographed image.

Although the technology described in Document 2 can obtain a print that the photographed location of the image is intuitively apprehensible, the technology simply combines a map to the photographed image, and is not sufficient in incorporating the related information with respect to the photographing in order that the family or friends may enjoy after the photographing.

The present invention has been made in view of the above circumstances and provides a mobile terminal device and a computer program which can create a new image, by acquiring various information relevant to an image photographed and relevant to photographing of the image, and by combining them to the original image in the mobile terminal device.

A mobile terminal device according to an embodiment of the present invention is capable of coupling to the Internet and a home network and includes: accompanying information storing means which stores an image obtained by photographing and accompanying information pertaining to the image and the photographing; search request means which requests a search server on the Internet to execute a search with the accompanying information as a keyword; search result storing means which temporarily stores search result obtained from the search server; image composition means which creates a composite image by combining the search result with the image obtained by the photographing; and transmission means which transmits the composite image to a specified output device on the home network.

The present mobile terminal device, responding to a user's operation, requests the search server on the Internet- to execute a search with the accompanying information pertaining to the image and the photography (for example, a photography date, a photography location, information inputted by a user) as a keyword, and creates a composite image by combining the search result with the original image. Further, the present mobile terminal device sends the composite image to a specified output device on the home network, and the composite image is displayed on a large screen display of the output device.

The mobile terminal device may further include a correspondence table associating URL of a search server which is requested to execute a search with each kind of the keyword. The search request means may request for a search server possessing URL corresponding to the kind of a keyword used for searching to execute the searching.

A computer program according to an embodiment of the present invention is executable by a mobile terminal device capable of coupling to the Internet and a home network, and includes the steps of: acquiring an image obtained by photographing and accompanying information pertaining to the image and the photographing; requesting a search server on the Internet to execute a search with the accompanying information as a keyword; storing temporarily search result obtained from the search server; creating a composite image by combining the search result with the image obtained by the photographing; and transmitting the composite image to a specified output device on the home network.

The other constitution and working-effects according to an embodiment of the present invention are explained in full detail in the following.

BRIEF DESCRIPTION OF THE DRAWINGS

The present invention will become fully understood from the detailed description given hereinafter and the accompanying drawings given by way of illustration only, and thus are not intended as a definition of the limits of the present invention, wherein:

FIG. 3 is a flow chart indicating an example of processing of the mobile terminal according to the embodiment of the present invention;

FIG. 4 (B) is a drawing illustrating an example of an image displayed by selection on the display screen of the mobile terminal according to the embodiment of the present invention;

FIG. 11 (B) is a drawing illustrating an example of user's operation with respect to composition of the related information to the original image, according to the embodiment of the present invention;

FIG. 11 (C) is a drawing illustrating an example of user's operation with respect to composition of the related information to the original image, according to the embodiment of the present invention;

FIG. 11 (D) is a drawing illustrating an example of user's operation with respect to composition of the related information to the original image, according to the embodiment of the present invention;

DETAILED DESCRIPTION OF THE INVENTION

Hereinafter, with reference to the accompanying drawings, a preferred embodiment of the present invention is explained in detail.

Figure 1:
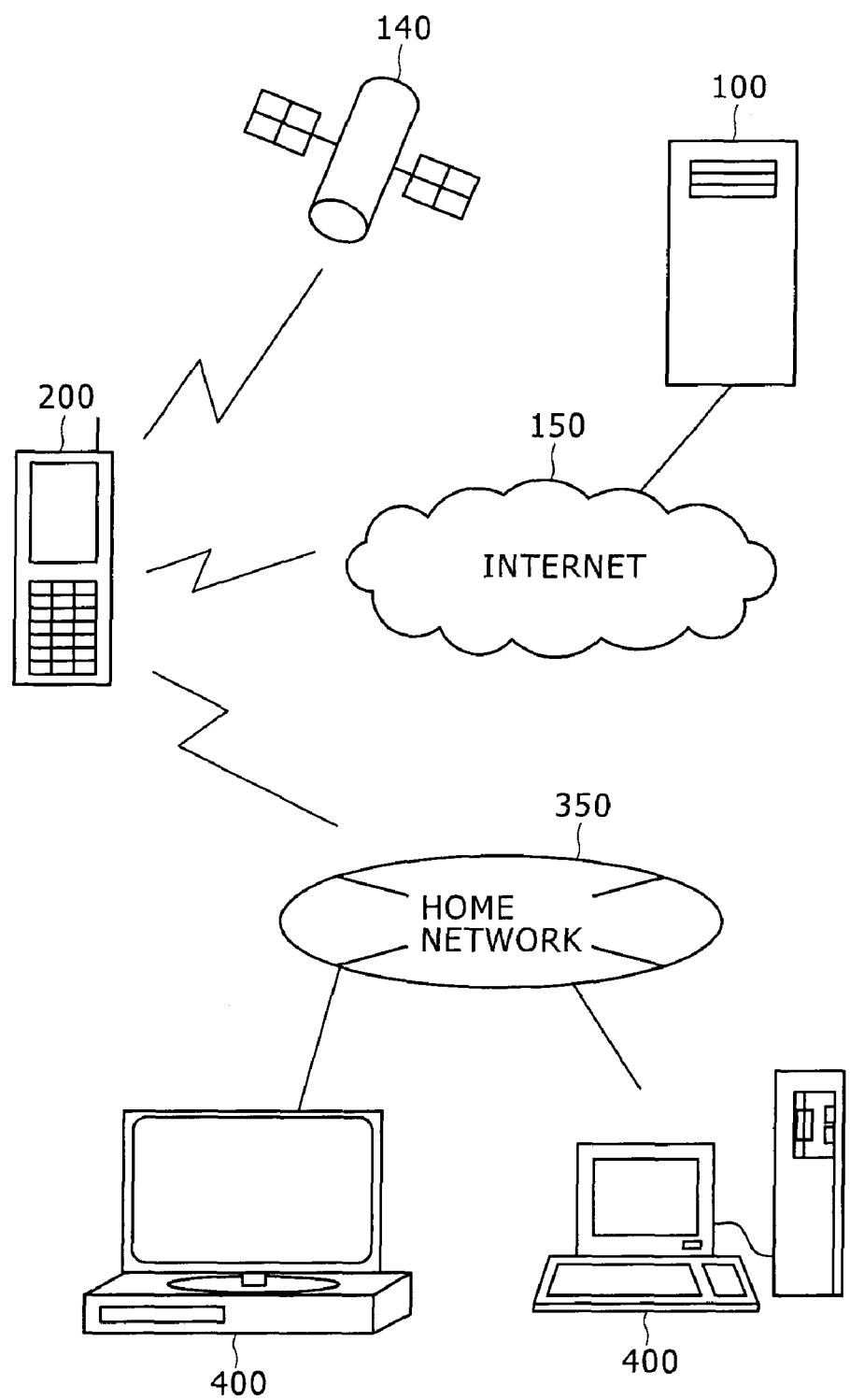
FIG. 1 is a drawing illustrating outline structure of a whole system according to an embodiment of the present invention.

FIG. 1 is a drawing illustrating outline structure of a whole system according to an embodiment of the present invention.

A camera-equipped mobile terminal 200 is positioned at the center of the system. The mobile terminal 200 possesses a function to couple to the Internet 150 and a function to couple to a local home network 350. The mobile terminal 200 couples to one or more search servers 100 through the Internet 150 and couples to one or more output devices 400 through the home network 350. The home network 350 may employ a wireless network including a wireless interface with the mobile terminal 200 (Blue tooth (registered trademark), wireless LAN, etc.) and may employ a network which uses a wired network in part. The output device 400 is a personal computer provided with a display device and a television device, for example, which outputs visual information on a display screen. The mobile terminal 200 further possesses a GPS receiving function to receive a radio wave from a predetermined GPS satellite 140 (actually, from plural satellites) and to detect one's actual position (latitude, longitude, altitude, etc.).

The present embodiment explains the home network 350 to be in conformity with DLNA (Digital Living Network Alliance). The functions of various kinds of equipment of DLNA include DMS (Digital Media Server), DMC (Digital Media Controller), DMR (Digital Media Renderer), and DMP (Digital Media Player).

DMS is a server which manages and releases to the public the digital contents shared on a communication network. Generally, PC, a video recording and reproducing device, a digital camera, etc. can serve as DMS. DMP is a player which reproduces the digital contents released to the public by DMS. Generally, a TV set, a digital music player, a stereo system, etc. can serve as DMP. DMC is a controller which controls start, stop, fast forward, etc. of the reproduction of contents. DMR is a device which reproduces contents chiefly under the control of DMC. DMR possesses no user interface for selection or reproduction operation of contents. A picture monitor, a speaker, etc. can serve as DMR. DMP can be regarded as possessing both functions of DMC and DMR. An individual device supporting DLNA may be provided with one or more of the functions described above. For example, one device can serve as DMS and DMC, as DMS and DMP, or as DMS and DMR. In the case of the present embodiment, the mobile terminal 200 serves as DMS and DMC. The mobile terminal 200 can also serve as DMS and DMP.

The present system can be used without changing the current DLNA specification. Any device which corresponds to DLNA can be operated reciprocally on a network, irrespective of the maker of the device.

The mobile terminal 200 functions as a client in relationship with the search server 100 on the Internet 150, and accesses to the search server 100 and receives search service.

In the system of FIG. 1, the mobile terminal 200 acquires, at the time of photographing by the built-in camera, the information accompanying to the photographing (EXIF information), such as a photography date, a photography time, a photography location, etc., and stores the accompanying information with the photographed image data. It is possible to add arbitrary information which the user inputs with respect to the photographed image, as tag information. The tag information also serves as "accompanying information" of the image concerned.

The mobile terminal 200 selects the image stored inside, and sends to the search server 100 the accompanying information added to the selected image as a keyword. The search server 100 searches the information corresponding to the keyword, and returns the obtained search result information to the mobile terminal 200. The mobile terminal 200 performs image editing such as composing the returned search result information to the image concerned according to the user's instructions and stores the editing result. The mobile terminal 200 sends the composed image concerned (composite image)

to the specified output device 400 to be displayed. In the present embodiment, it is assumed that the output device 400 has the size of a display screen sufficiently larger than that of the display screen of the mobile terminal 200, allowing plural users to watch at the same time.

Figure 2:
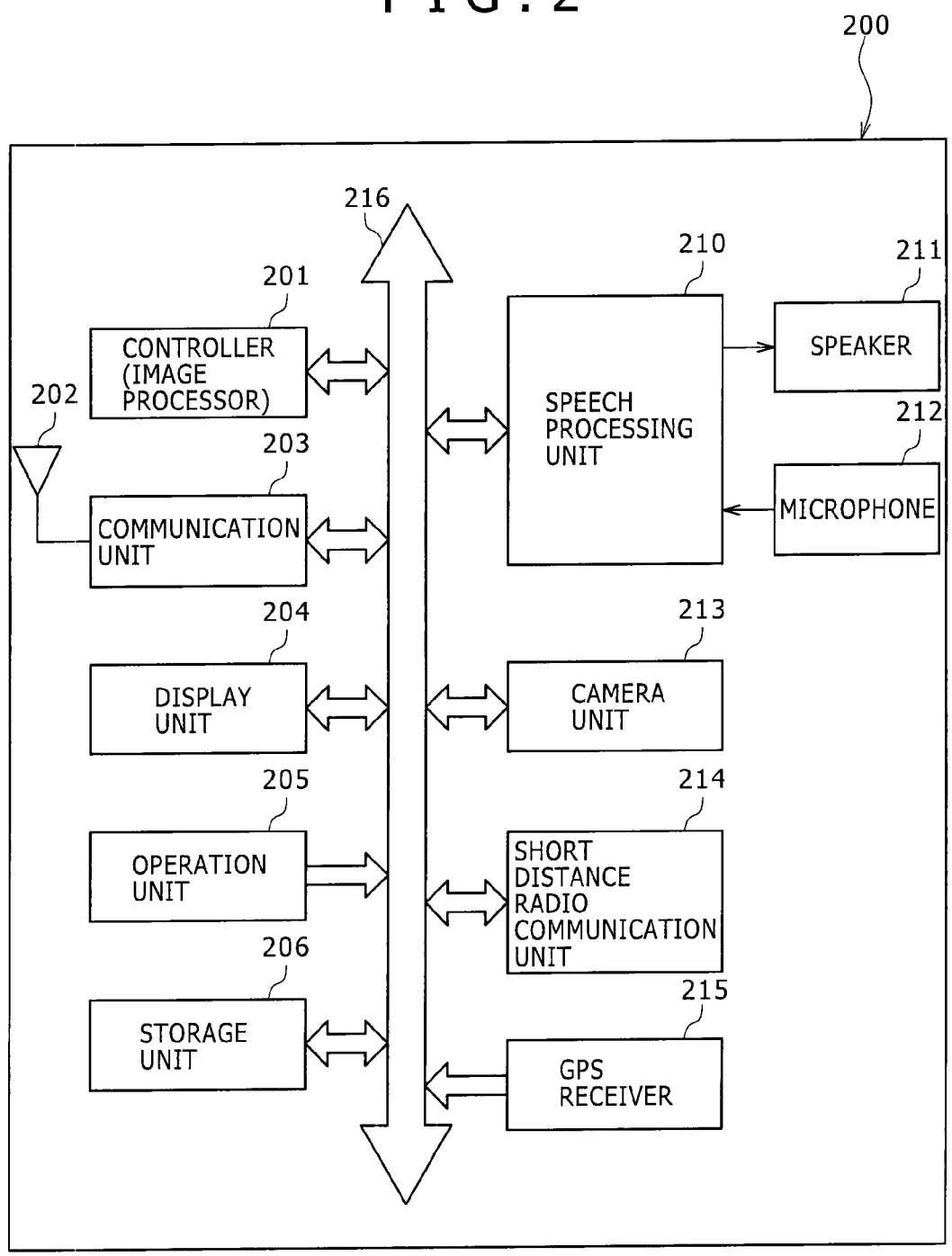
FIG. 2 is a block diagram illustrating the outline hardware configuration inside a mobile terminal according to the embodiment of the present invention.

FIG. 2 is a block diagram illustrating the outline hardware configuration inside the mobile terminal according to the present embodiment.

The mobile terminal 200 possesses plural units which are mutually coupled by a bus 216. The units include a controller 201, a communication unit 203, a display unit 204, an operation unit 205, a storage unit 206, a speech processing unit 210, a speaker 211 and a microphone 212 both coupled to the speech processing unit 210, a camera unit 213, a short distance radio communication unit 214, and a global positioning system receiving unit (GPS receiver) 215. Accompanying information storing means, search result storing means, and mail storing means of the present invention are composed by the storage unit 206.

The controller 201 includes CPU etc. and controls each part of the mobile terminal 200. In the present embodiment, the controller 201 functions also as an image processor which performs various kinds of image processing including the image composition to be described later. Image composition means of the present invention is composed by the controller 201. Search request means of the present invention is composed by the controller 201 and the communication unit 203. Of course, an image processor which is independent of the controller 201 may be provided. Transmission means of the present invention is composed by the short distance radio communication unit 214.

The communication unit 203 includes an RF unit, a modulation circuit, etc., and performs wireless communication for a telephone call, a mail, WEB data, etc. via an antenna 202 with a base station.

The display unit 204 provides a display interface for presenting visual information to a user, and includes display devices, such as an LCD and an organic electroluminescence display.

The operation unit 205 provides an input interface for a user to input instructions and data, and includes various operation keys, such as a numeric keypad, a cursor moving key, a talk key, and a power key.

The storage unit 206 includes storage devices, such as RCM, RAM, and HDD, and stores OS and programs of various applications which CPU executes, and various data. ROM may include a nonvolatile memory which is able to re-write, such as a flash memory. The programs also include a program and necessary data for realizing the function of DLNA in the present embodiment.

The speech processing unit 210 includes an audio encoder and decoder, a D/A converter, an A/D converter, etc., and performs the voice output to the speaker 211 (including an earphone) and the voice input from the microphone 212.

The camera unit 213 possesses image sensors, such as CMOS and CCD, etc., and composes a photographing unit for obtaining the digital image data of the photographed subject.

The short distance radio communication unit 214 possesses wireless communication means such as a wireless LAN and Blue tooth (registered trademark).

The GPS receiver 215 is position detecting means which receives the signal from the GPS satellite 140 and outputs position information. The position detecting means does not necessarily need to be based on GPS. Alternatively, in the case of a mobile-phone terminal, the position detecting means may obtain the position information based on a mobile-phone base station. The position information is not restricted to latitude and longitude. Alternatively, it may be the name of a place, the name of a town, etc.

FIG. 3 is a flow chart indicating an example of processing of the mobile terminal 200 on a typical case of utilization of the present system. As a premise of the present processing, it is assumed that an image which a user has acquired with the camera is stored in the mobile terminal 200 together with the accompanying information.

Figure 4A:
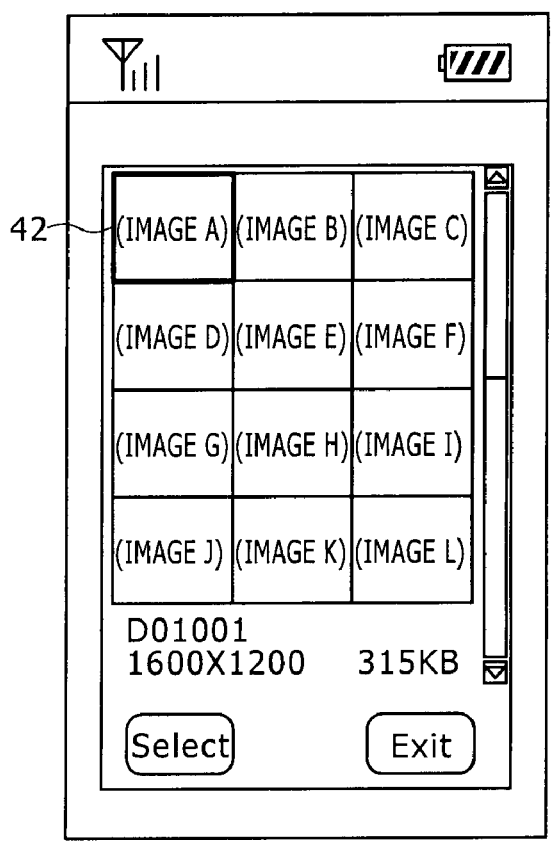
FIG. 4 (A) is a drawing illustrating an example of the thumbnail display of images on a display screen of the mobile terminal according to the embodiment of the present invention.
Figure 4B:
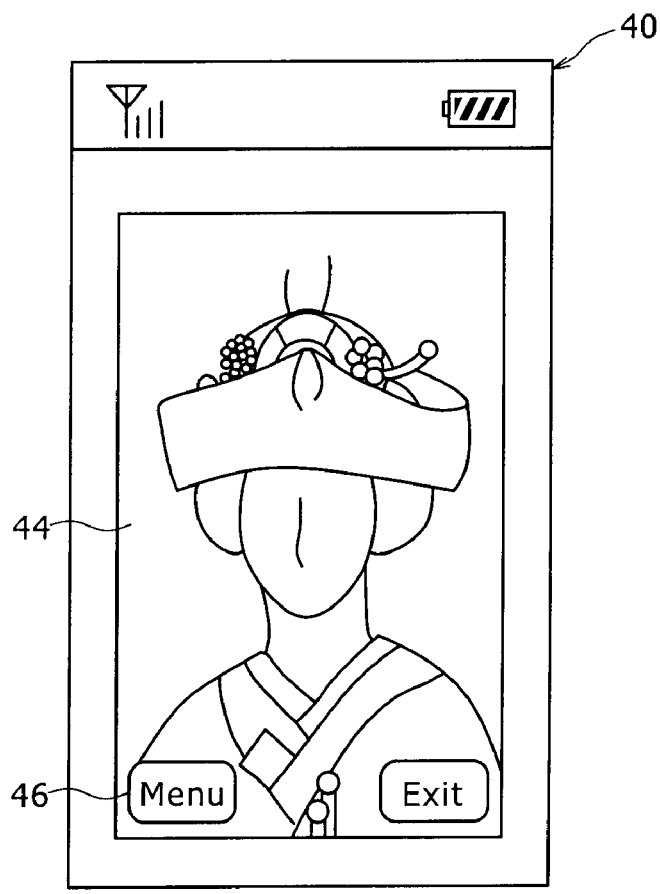

According to user's instructions, the mobile terminal 200 selects a desired image out of the images stored in the storage unit 206 (Step S10), and acquires the accompanying information (Step S11). The image can be selected from a thumbnail display of images as illustrated in FIG. 4 (A) (or from an image list display (not shown)). In the present example, an image to which attention is paid is displayed with emphasis and the user can move the emphasized display by a cursor moving key. In FIG. 4 (A) the emphasized display is exemplified with a thick frame 42 surrounding an image. Alternatively, the emphasized display may employ arbitrary display styles, such as a highlight display. The ID information, the resolution, and the amount of data of an image displayed with emphasis are displayed on the bottom of screen. FIG. 4 (B) illustrates a related information list screen 40, full of which the selected image is displayed as an original image 44 of a composite image.

The image acquired as the original image 44 and the related information is stored in the mobile terminal 200, with a high resolution as it is. Then a copied image is displayed, with a suitably reduced size corresponding to the display size of a display screen. Accordingly, when the image is later sent to an output device and displayed on a large-size display screen, lack of the resolution can be avoided.

Figure 5:
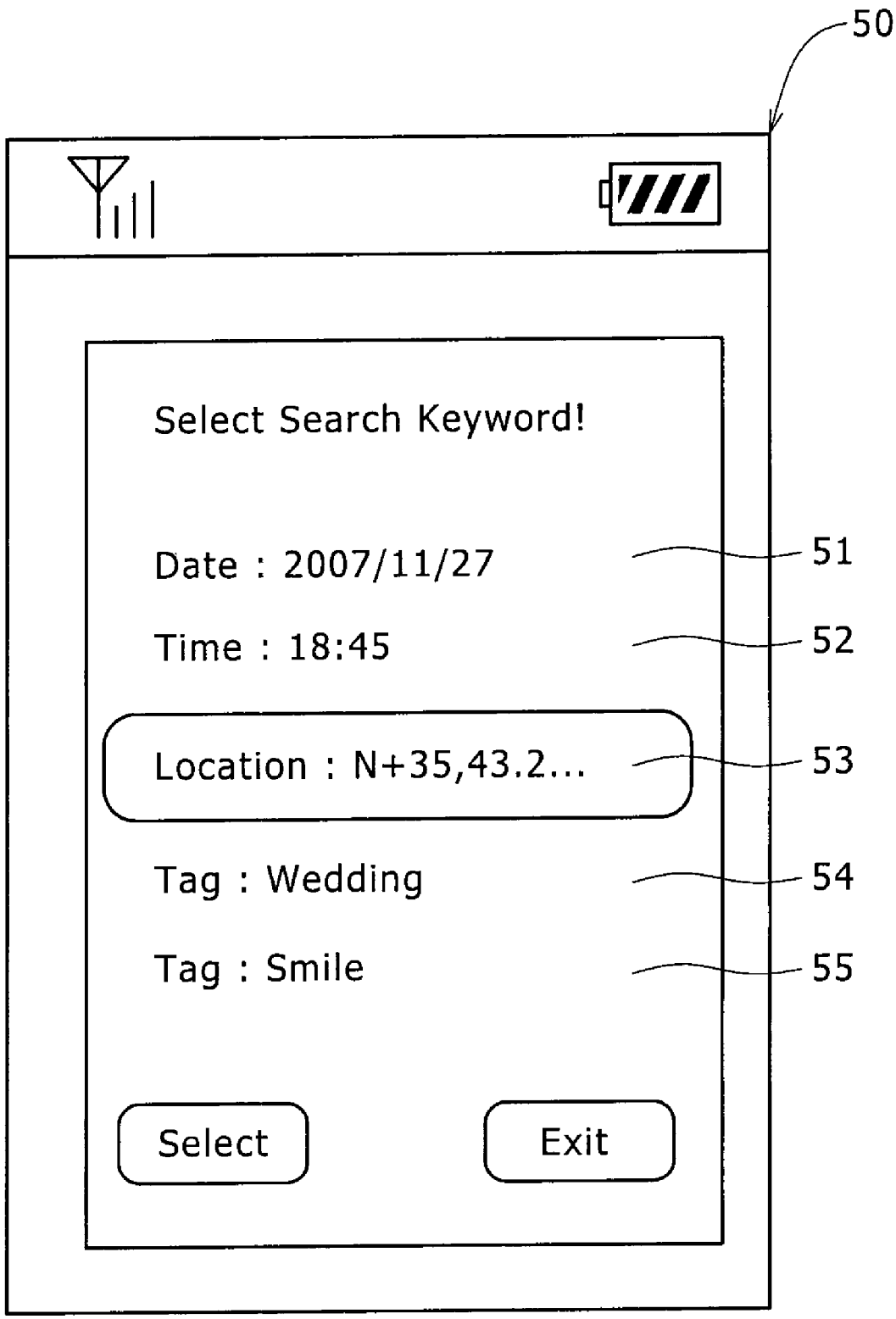
FIG. 5 is a drawing illustrating a keyword list screen which lists accompanying information of an image as an option of a keyword for search, according to the embodiment of the present invention.

Subsequently, by the operation of a "Menu" button, for example, of the screen of FIG. 4 (B), a list display of the accompanying information of the image is performed as options 51-55 of the keyword for search (Step S12), as illustrated in a keyword list screen 50 of FIG. 5. The accompanying information includes EXIF information, tag information, etc. as described above. In the present example, the accompanying information includes the photography date, photography time, and photography location of the image, and a phrase which a user inputs (tag information). The user selects any one of these keywords for use in search (Step S13). The keyword to which attention is paid is highlighted also in this case. It is also preferable to accept selection of plural keywords at the same time. In that case, search of AND of the keywords is performed.

Figure 6:
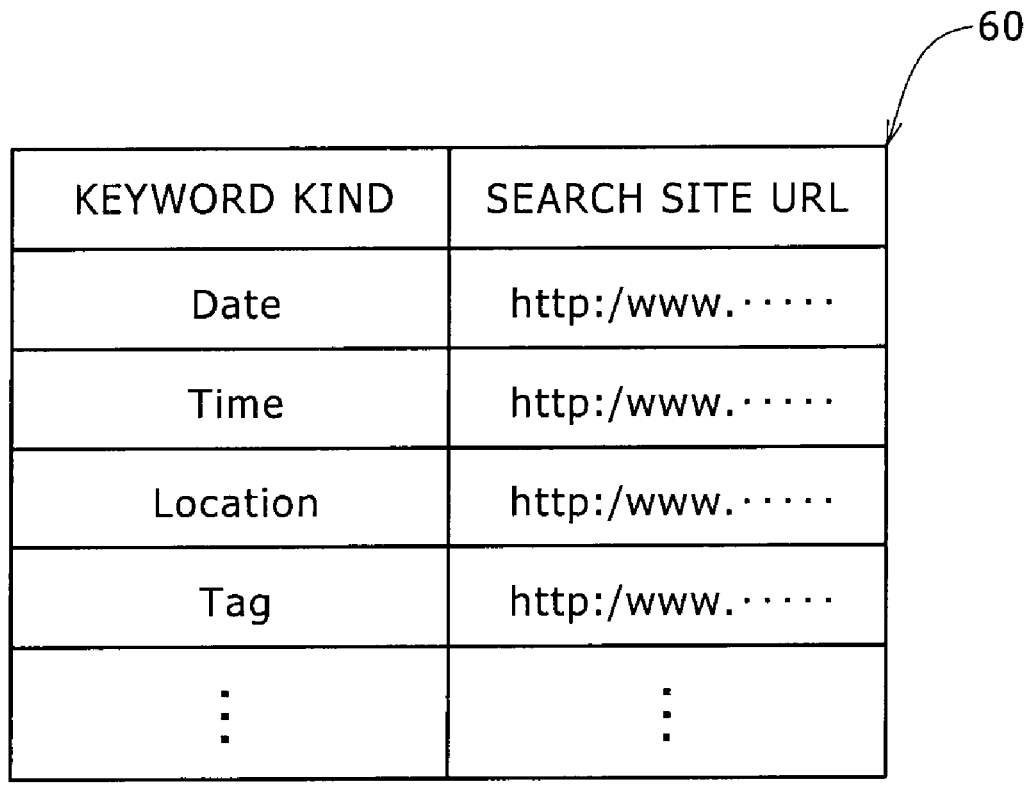
FIG. 6 is a drawing illustrating an example of a correspondence table associating "keyword kind" and "search site URL", according to the embodiment of the present invention.

A single fixed search site (search server) may be used, or alternatively, a different search site according to the kind of keyword may be used. In that case, as illustrated as a correspondence table 60 in FIG. 6, "keyword kind" and "search site URL" are associated with each other and stored in the storage unit 206 beforehand, together with a program which realizes the operation of the present embodiment. For example, it is possible to associate a map search site with "Location", and a news search site with "Date". Plural search site URLs may be registered corresponding to one keyword kind. In this case, the search result of the plural search sites is extracted by a logical addition (OR).

In this way, by associating a different search site according to the kind of keyword, related information (noise) other than the kind of related information for which a user wishes can be eliminated.

The number of the keyword which a user specifies at once is not restricted to one piece. Plural keywords may be specified at the same time, and search by logical product (AND)

may be performed. In that case, the search site to be used may not be restricted in particular. The search site may be decided beforehand for every combination of the keyword kind, for example. As an alternative, when plural pieces of keyword kind are specified, a search site fixed beforehand may be used. As a further alternative, one or plural search sites specified for one or plural pieces of keyword kind out of the plural pieces of keyword kind may be used.

Now back to FIG. 3, when instructions of search of the related information is issued by a user ("Yes" at Step S14), the mobile terminal 200 accesses a predetermined search site through the Internet 150 (Step S15). When searching of the related information is performed and list information is obtained as the result, the list information is displayed on a display screen (Step S16). "List information" here does not mean the entire body of data of the search result, but means the information for identifying the body of data (a title, an outline, etc.). Of course, a mode in which the body of data itself is acquired straight away may be practicable. In preparation for the case where the hit number of search becomes great, the maximum number of the related information to be acquired at once may be determined beforehand.

Figure 7:
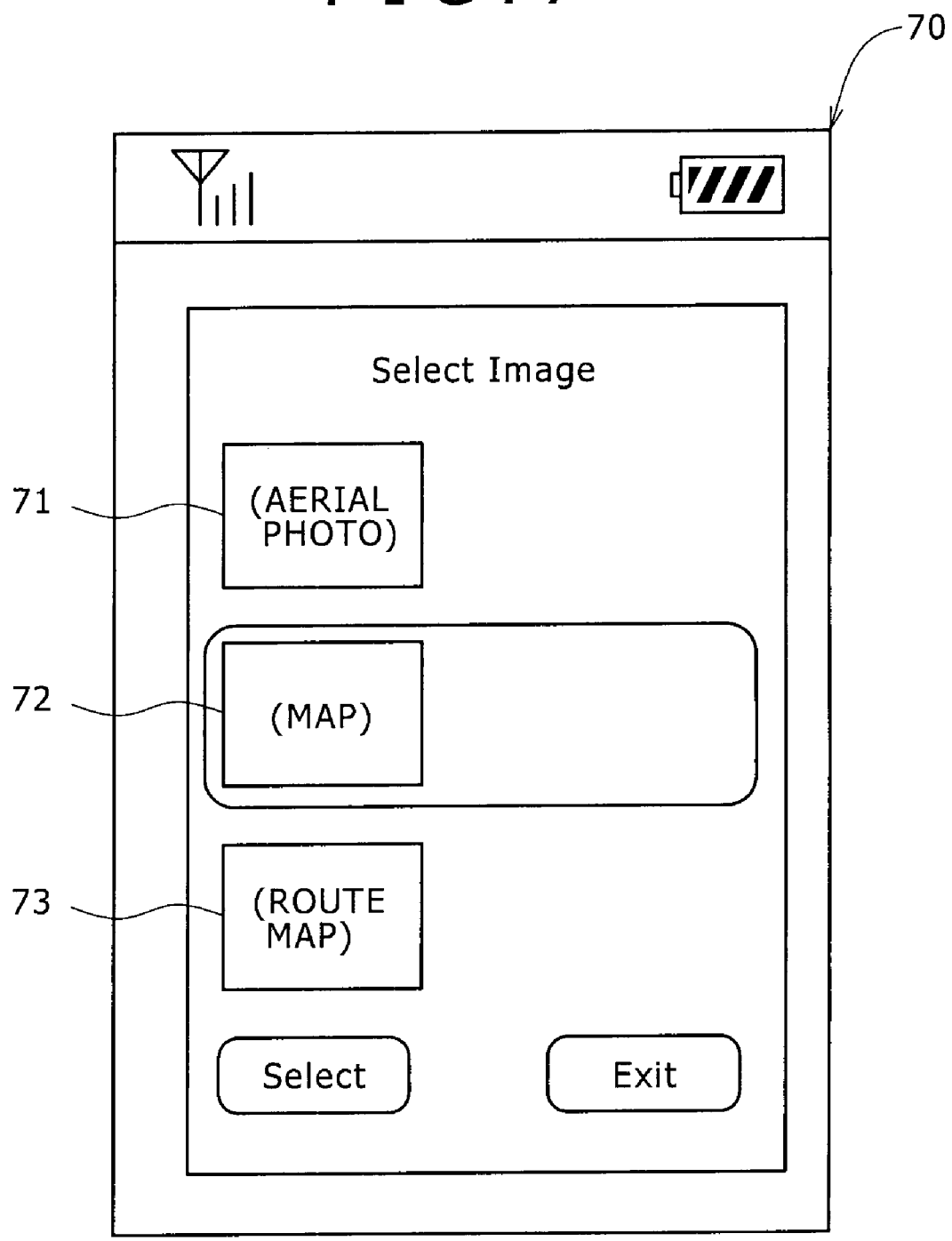
FIG. 7 is a drawing illustrating a screen which the mobile terminal displays on the display screen a related information list obtained as a result of searching of related information about a certain keyword by a search server, according to the embodiment of the present invention.

FIG. 7 illustrates a screen which the mobile terminal 200 displays the related information list including related information 71-73, on the display screen. The related information 71-73 is obtained when a certain keyword is selected and the search server searches the related information about the keyword. "Related information" is relevant to a keyword, and may change depending on each of keywords and search sites. The kind of related information includes an image, a text, etc. The example of FIG. 7 illustrates the state where plural images (here an aerial photo, a map, a route map), which are obtained as a result of having searched the map search site with the photography position information as a keyword, are listed by thumbnail. Also in this picture, an image to which attention is paid is highlighted and can be moved by the user. The search result is not necessarily of plural pieces, and the search result may be of a single piece or may be "data is not available".

When a user selects specific related information from the screen of the related information list (Step S17), the download of the body of data of the related information is requested (Step S18). When the body of data of the related information concerned is sent from the search server in response to the download request, the body of data is acquired (Step S19).

When instructions to paste the related information on the original image is issued by a user ("Yes" at Step S20), the image to be pasted is composed to the original image (Step S21). In this case, a copy of the original image stored in the mobile terminal is created temporarily in the storage unit 206, and is displayed with the image to be pasted. By creating and using a copy of the original image, otherwise possible breakdown of the original image can be prevented. When the related information is data other than images, such as a text, the data is converted into a bit-mapped image and composed with the original image. A concrete example of the user's operation with respect to composition of the related information to the original image is described later.

Figure 8:
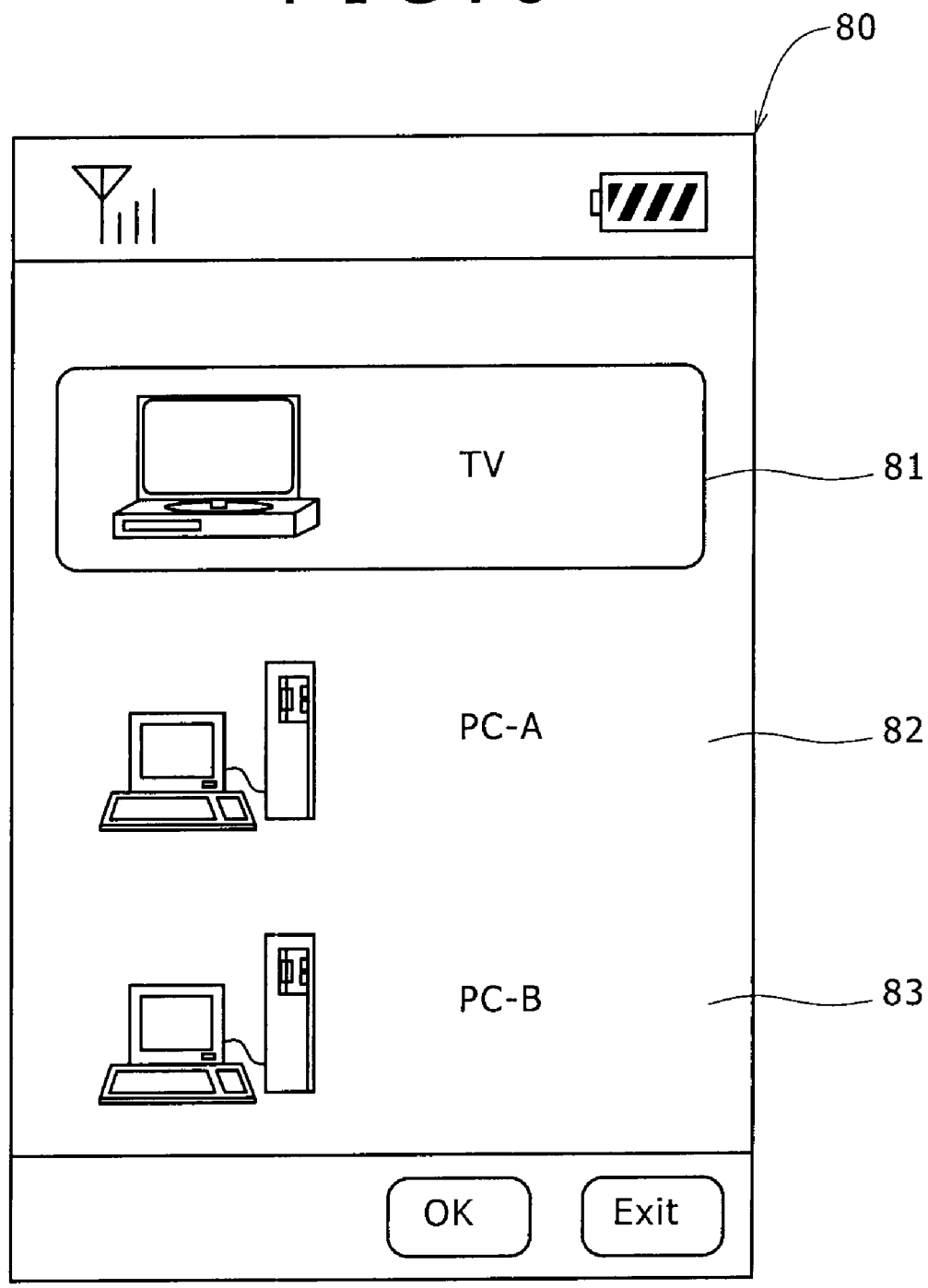
FIG. 8 is a drawing illustrating an output device list screen which lists detected output devices as an option on the display screen, according to the embodiment of the present invention.

Responding to the instructions to send an image to the output device 400 by a user ("Yes" at Step S22), the mobile terminal searches the output device on the home network 350 (Step S23). As illustrated in an output device list screen 80 of FIG. 8, a list of the detected output devices 400 is displayed on the display screen as options 80-83 (Step S24). When the user selects one output device 400 (Step S25), the mobile terminal sends the composite image in the storage unit 206 to the selected output device 400 through the home network 350 (Step S26).

The output device 400 as partner equipment to which the composite image is sent is assumed mainly to be a monitor or a TV set which possess a larger screen size than the mobile terminal. The user can watch the image of the mobile terminal on a large screen with his or her friends and family. At the same time, the user can enjoy himself watching the related information which has been obtained from the search server or inputted by the user and which has been added to the image information.

When a predetermined time has passed after the end of edit or immediately after the transmission, the copied image may be deleted automatically, so that the copied image (composite image) might not occupy the storage area within the mobile terminal. Accordingly, the system can be restored to the same state as before using.

Figure 9:
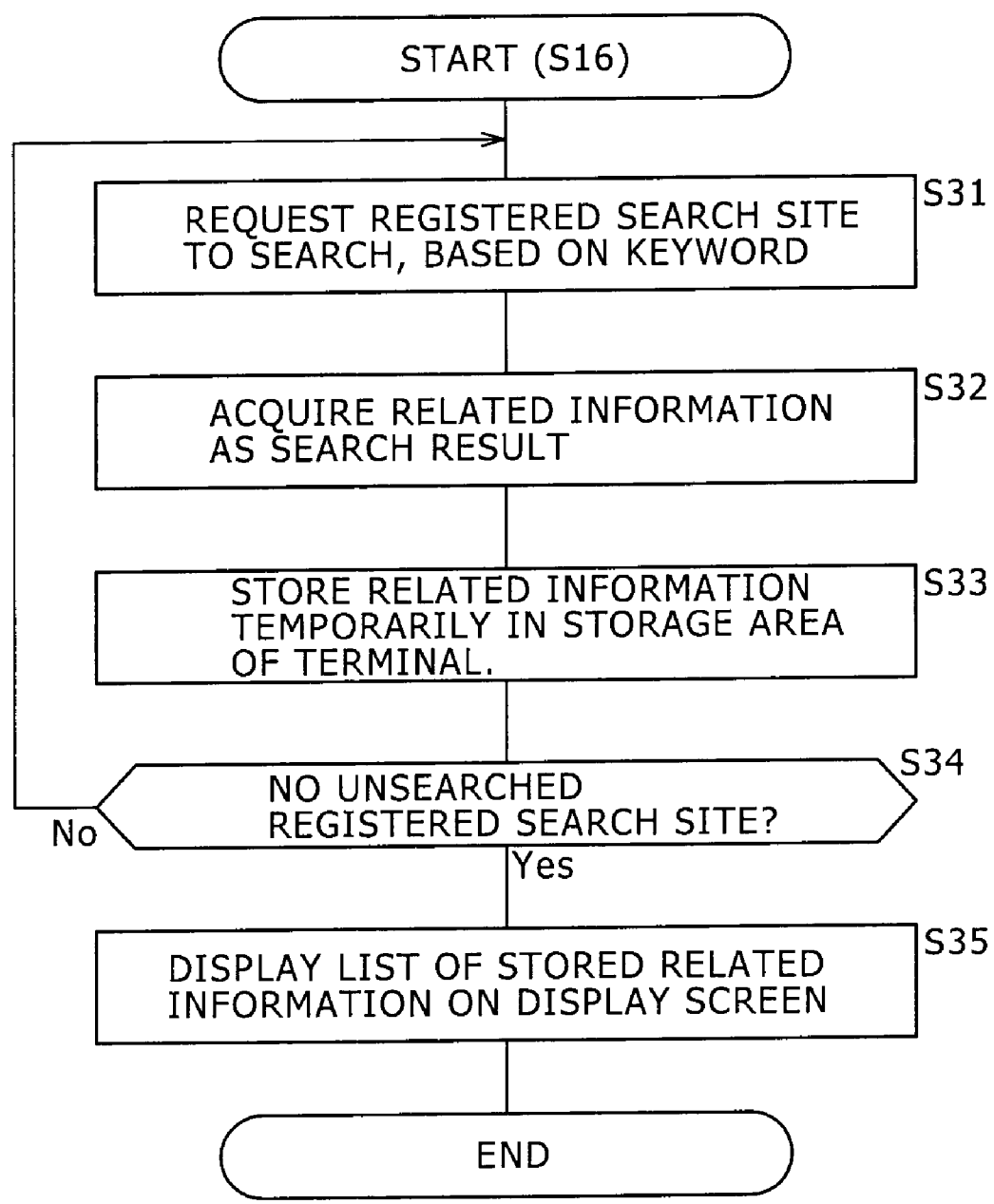
FIG. 9 is a flow chart illustrating details of the processing in searching related information and displaying a list of the searched result, as illustrated at Step S16 in FIG. 3.

FIG. 9 explains the details of the processing illustrated at Step S16, at which the related information is searched and the list is displayed.

First, based on a keyword, execution of the search is requested of a registered search site (Step S31). The related information as the search result is obtained from the search site (Step S32), and stored temporarily in the storage area within the mobile terminal (Step S33).

When there is a search site further to be searched on the keyword concerned ("No" at Step S34), the flow returns to Step S31. Otherwise, the list of the stored related information is displayed on the display screen (Step S35).

Figure 10:
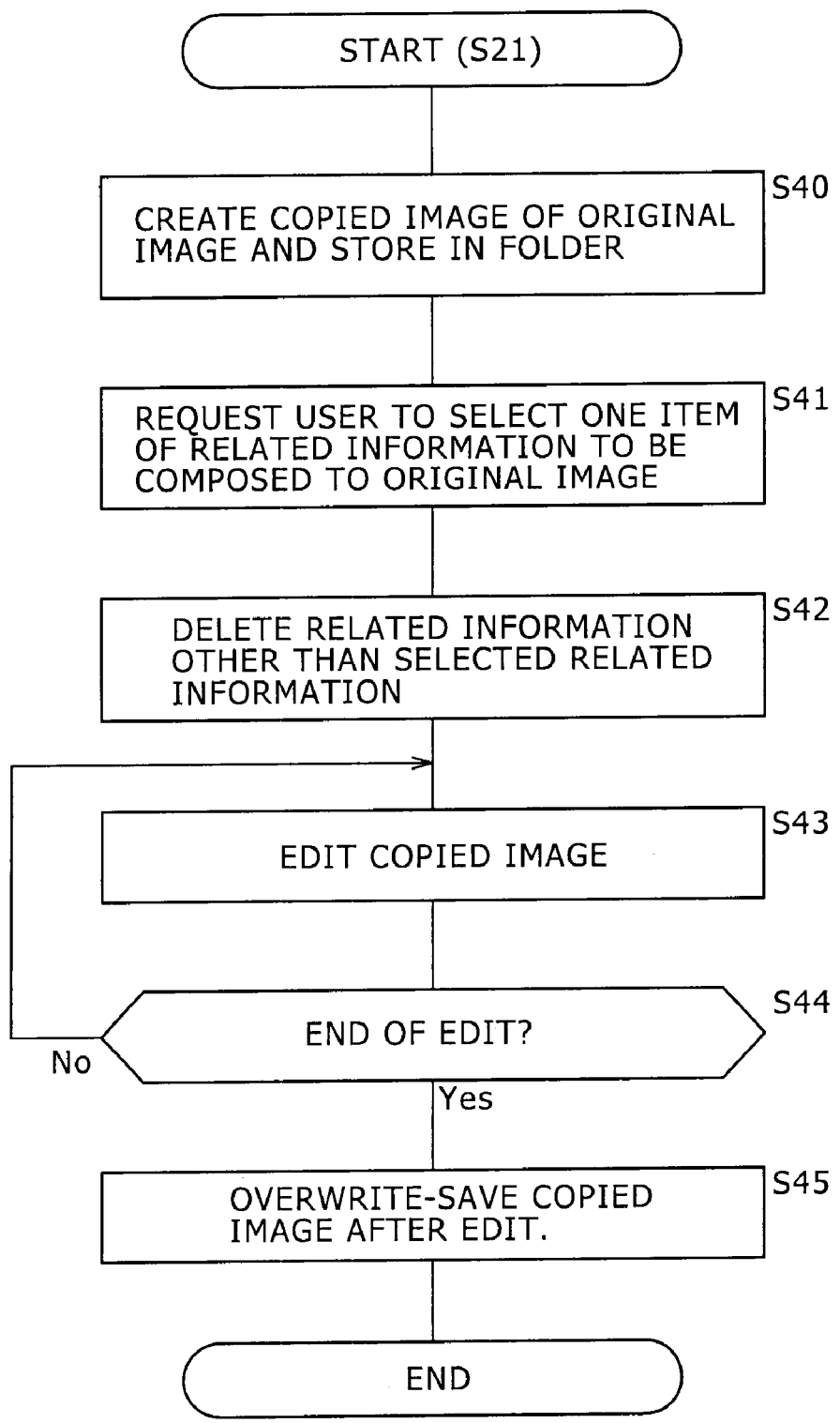
FIG. 10 is a flow chart illustrating details of the composite processing of images, as illustrated at Step S21 in FIG. 3.
Figure 11A:
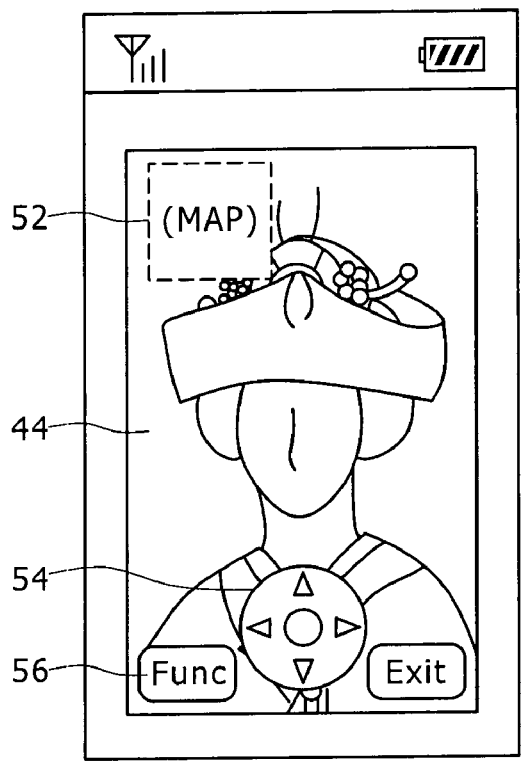
FIG. 11 (A) is a drawing illustrating an example of user's operation with respect to composition of related information to an original image, according to the embodiment of the present invention.
Figure 11B:
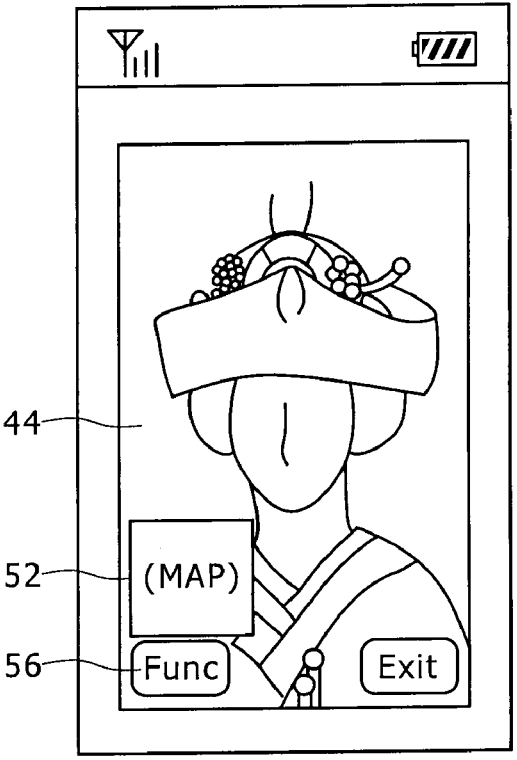
Figure 11C:
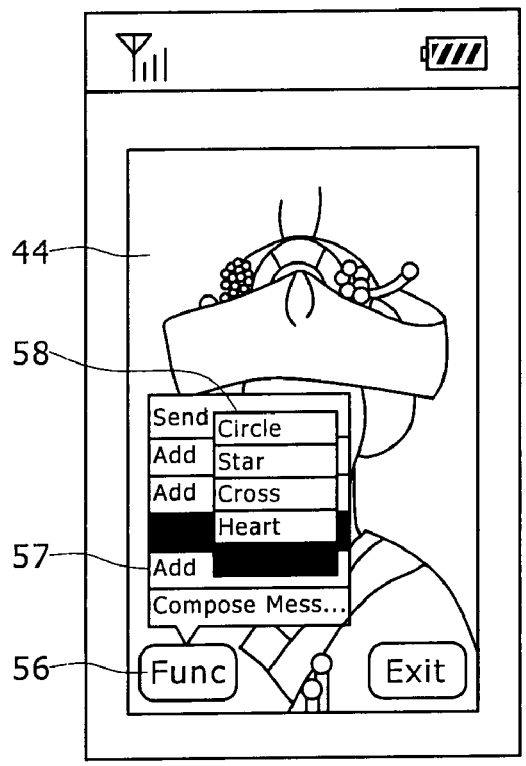
Figure 11D:
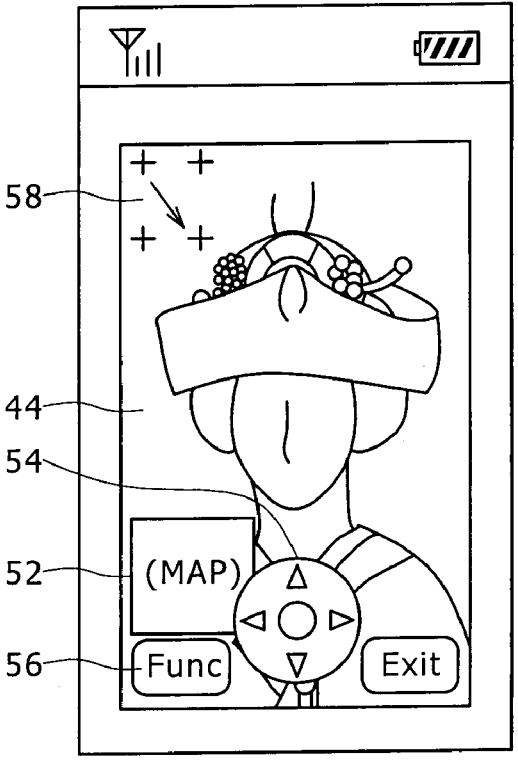

FIG. 10 explains the details of the composite processing of the image illustrated at Step S21.

First, a copy of the original image is created (Step S40). Subsequently, a user is requested to select one item of related information to be composed to the copied image (Step S41). Related information other than the selected related information is deleted (Step S42). According to the operation of the user in terms of the function menu etc., which is described later, editing is performed, such as composing the selected related information concerned and other related information, to the copied image of the original image (Step S43). Step S43 is continued until the editing is completed. When the editing is completed ("Yes" at Step S44), the copied image after edit (namely, composite image) is overwrite-saved (Step S45).

FIGS. 11 (A) to 11 (D) explain the concrete example of the user's operation with respect to composition of the related information to the original image. Here, an example of edit is shown. In the edit, various kinds of the related information including a map image 52, which is the related information obtained by search with the photography location of the original image 44 as a keyword, are pasted on the original image 44.

The selected related information is arranged in a certain position on the display screen decided at the beginning as illustrated in FIG. 11 (A), and it can be moved vertically and horizontally by a cursor moving key provided by a softkey display 54. FIG. 11 (B) illustrates the state where the map image 52 is moved to a finally-settled position. In this state, the map image 52 is composed to the original image, and becomes inseparable. The file data of the present composite image can be stored as a file with another name than the original image.

As illustrated in FIG. 11 (C), a function menu 57 is opened by instructions of a functional softkey "Func" 56. Depending on a menu item, a submenu 58 is opened further. The function menu 57 is a menu with respect to various kinds of functions relevant to the photographed image, in the mobile terminal according to the present embodiment. The function menu 57 includes menu items, such as "Send", "Add Image", "Add Mail", "Add Symbol", "Add Date", and "Compose Message". The menu item "Send" issues the instructions for sending a composed image to an output device. The menu item "Add Image" issues the instructions for searching related information in a search server and for composing the related information to an original image as an image. When an original image is associated with e-mail stored in the storage unit 206 (for example, when the original image is obtained as an attached file of the e-mail), the menu item "Add Mail" issues the instructions for composing, to the original image, the text of the e-mail as the related information. The menu item "Add Symbol" issues the instructions for composing, to an original image, graphical marks such as a circle, a star, a cross, a heart-shaped mark, and an arrow, as related information, as illustrated in the submenu 58 of FIG. 11 (C). The menu item "Add Date" issues the instructions for composing, to an original image, the photography date of the original image as related information. The menu item "Compose Message" issues the instructions for composing, to an original image, a message as related information. The message includes a message which is selected by a user from messages prepared in advance and a message which is inputted newly by a user. The menu item is not restricted to the items described above, and a menu item which realizes other functions may be added. The menu item described above may be instructed by other methods instead of the function menu 57.

FIG. 11 (D) illustrates the state where an arrow-shaped graphic image 58 is displayed in a movable manner when the menu item "Arrow" of "Add Symbol" is instructed. The graphic image 58 can be arranged at an arbitrary position on the original image by the operation of a cursor moving key, and can be composed to the original image at the final fixed position.

Figure 12:
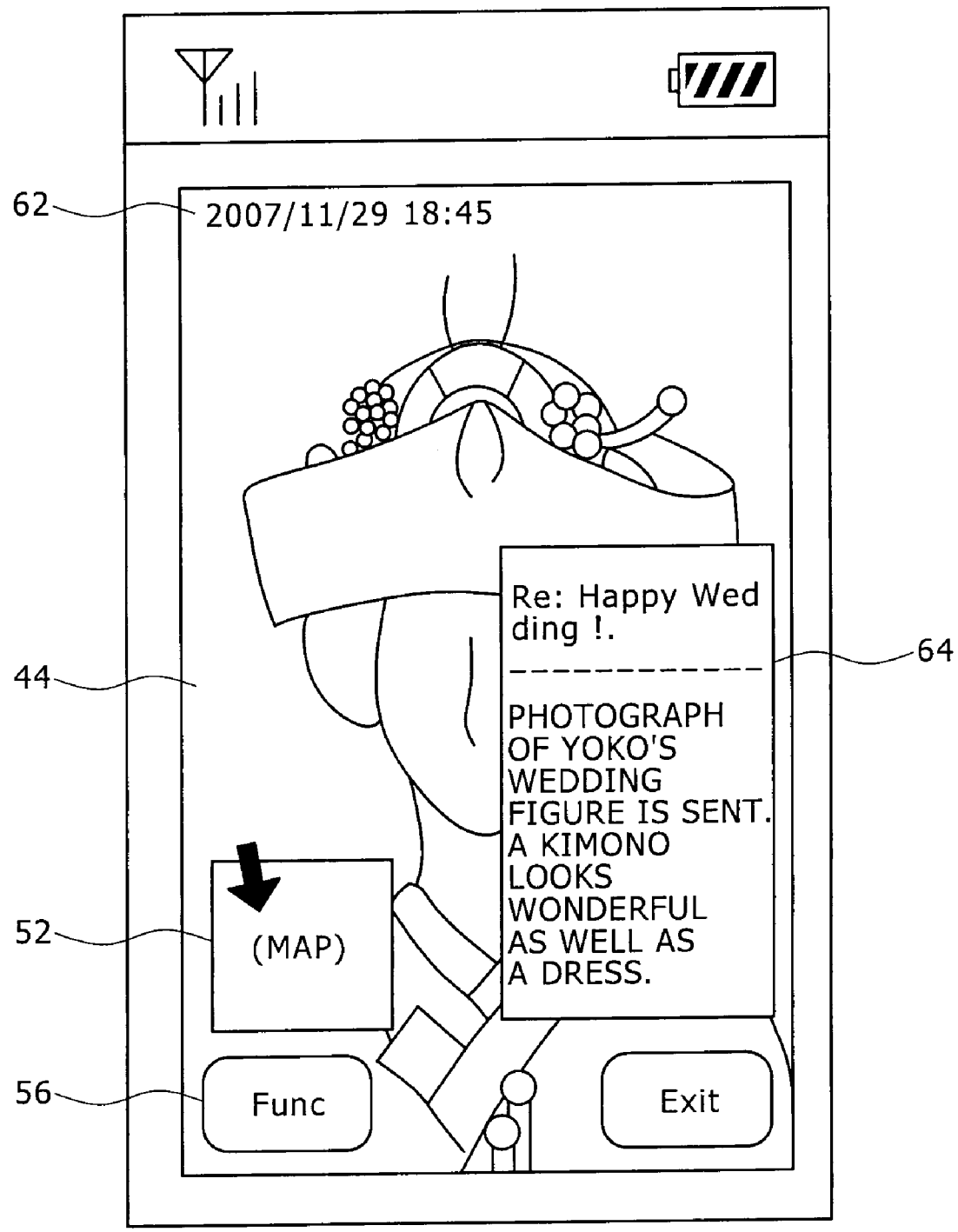
FIG. 12 is a drawing illustrating the state where a composite image is created by adding related information further to the original image illustrated in FIG. 11 (D)

FIG. 12 illustrates the state where additional related information is composed to the original image 44, by adding a photography date with the instructions of the menu item "Add Date", and by adding the text of e-mail with the instructions of the menu item "Add Mail". If the text of the e-mail exceeds the predetermined amount of data, only the predetermined amount of data is displayed. In this way, "story" can be imparted to a sheet of photographed image, by adding to the photographed image the actual related information, such as "when was the photographed image taken?", "which mail was the photographed image attached to?", or "where was the photographed image taken?", etc.

In one case, the composite image to be sent to the output device 400 is only a single composite image to which the composition operation of FIG. 12 has completed. In another case, the composite image to be sent includes all the composite images contained in the data folder specified beforehand or in the data folder specified by the user. It is arbitrary to adopt which one of the cases. It may be preferable that the user can select either case on a case-by-case basis.

Figure 13:
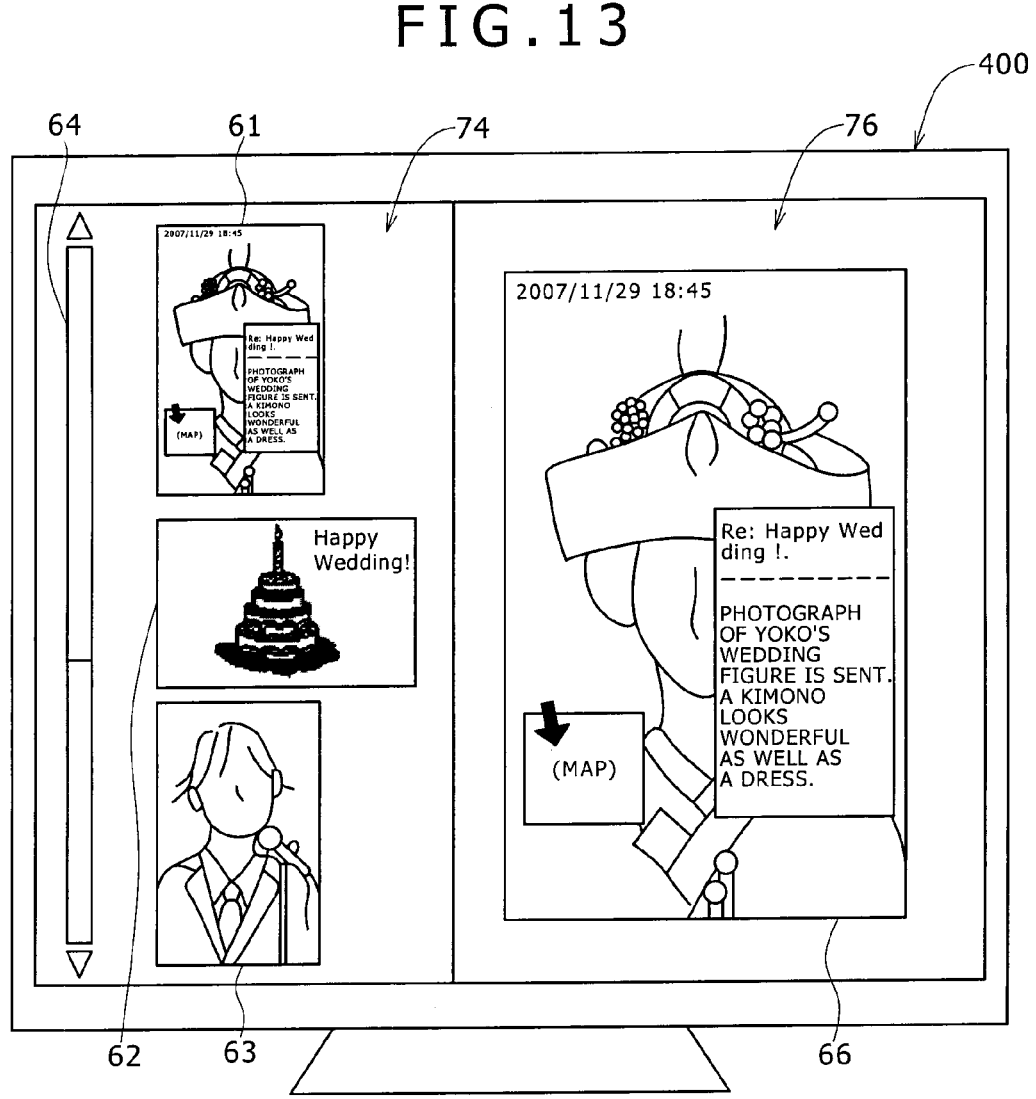
FIG. 13 is a drawing illustrating a display example of a composite image in an output device specified by a user, according to the embodiment of the present invention.

FIG. 13 illustrates the display example of the composite image in the output device 400 specified by the user. The present example corresponds to the case where plural composite images in the data folder specified beforehand as described above are sent to the output device 400. The present example provides an area 74 in which the composite images included in the data folder are displayed as thumbnail images 61 to 63 and an area 76 in which one composite image selected is displayed. When all the thumbnail images in the data folder concerned are not displayed in the area 74, scrolling is enabled with an accompanied scroll bar display 64. An attached remote control device (not shown) can perform the operation of the output device 400.

In this way, by using the present system, a composite image can be sent to an output device different from the mobile terminal which has composed the image, and the composite image can be shared and enjoyed by a family or friends.

By using the present system, even if the electrical household appliances in the environment are not changed, each of the appliances can be utilized as a new communication tool.

In the above, the preferred embodiment of the present invention is explained. However, it is possible to make various changes and modifications besides what has been described in the above. For example, although it is assumed that the related information is a text and a drawing (still image), the related information may include an animation, music data, etc. and the data after composition may be converted to multimedia data.

According to an embodiment of the present invention, by searching related information based on the information accompanying to a photographed image, it is possible to collect various related information quickly and easily, and by composing the desired related information to the photographed image out of the obtained related information, it is possible to easily perform the work to incorporate various related information in one sheet of photographed image.

By sending such a composed image to the specified output device on a home network, plural users can share and enjoy the same composite image in the output device.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile terminal device capable of coupling to the Internet and a home network, the mobile terminal device comprising:
    a storage unit configured to store an image obtained by photographing and accompanying information pertaining to the image and the photographing;
    a user interface configured to display the accompanying information and receive an input selecting a piece of the accompanying information;
    a processor configured to request a search server on the Internet to execute a search with the selected piece of accompanying information as a keyword, wherein the storage unit is configured to temporarily store a plurality of search results selected from the group comprising an aerial photo, a map and a route map obtained from the search server;
    the user interface configured to display the plurality of search results, receive an input selecting one of the plurality of displayed search results, display the selected search result superimposed on the image, and receive an input selecting a location at which to superimpose the selected search result on the image;
    the processor configured to create a composite image by superimposing the selected search result on the image at the location corresponding to the received input; and
    an interface configured to transmit the composite image to a specified output device on the home network.

2. The mobile terminal device according to claim 1, further comprising:
    a correspondence table associating URL of a search server which is requested to execute a search with each kind of keyword, wherein the processor is configured to request a search server possessing URL corresponding to a kind of a keyword used for searching to execute the searching.

3. The mobile terminal device according to claim 1, wherein the accompanying information is data which is automatically appended to a photographed image along with the photographing.

4. The mobile terminal device according to claim 1, further comprising:
   means for detecting a current position,
   wherein the accompanying information is position information obtained by the means for detecting.

5. The mobile terminal device according to claim 1, wherein, the storage unit is configured to store a received e-mail, and the processor is configured to combine text of the received e-mail with a photographed image when the photographed image is attached to the received e-mail.

6. A non-transitory computer-readable medium storing a computer program, which when executed by a computer included in a mobile terminal device capable of coupling to the Internet and a home network, causes the mobile terminal to perform a method comprising:
   acquiring an image obtained by photographing and accompanying information pertaining to the image and the photographing;
   displaying the accompanying information;
   receiving an input selecting a piece of the accompanying information;
   requesting a search server on the Internet to execute a search with the selected piece of accompanying information as a keyword;
   storing temporarily a plurality of search results selected from the group comprising an aerial photo, a map and a route map obtained from the search server;
   displaying the plurality of search results;
   receiving an input selecting one of the plurality of displayed search results;
   displaying the selected search result superimposed on the image;
   receiving an input selecting a location at which to superimpose the selected search result on the image;
   creating a composite image by superimposing the selected search result on the image at the location corresponding to the received input; and
   transmitting the composite image to a specified output device on the home network.

7. The mobile terminal device according to claim 1, wherein the accompanying information includes at least one of a date, time and location corresponding to the image.

* * * * *